(12) United States Patent
Brandsma et al.

(10) Patent No.: US 7,780,557 B2
(45) Date of Patent: Aug. 24, 2010

(54) EFFICIENT HIGH TORQUE CONTINUOUSLY VARIABLE TRANSMISSION

(75) Inventors: Arjen Brandsma, Tilburg (NL); Johannes Gerardus Ludovicus Maria Van Spijk, Drunen (NL)

(73) Assignee: Bosch Transmission Technology B.V., Tilburg (NL)

( * ) Notice: Subject to any disclaimer, the term of this patent is extended or adjusted under 35 U.S.C. 154(b) by 1819 days.

(21) Appl. No.: 10/488,612

(22) PCT Filed: Sep. 3, 2002

(86) PCT No.: PCT/EP02/09953

§ 371 (c)(1),
(2), (4) Date: Mar. 4, 2004

(87) PCT Pub. No.: WO03/021134

PCT Pub. Date: Mar. 13, 2003

(65) Prior Publication Data

US 2004/0248683 A1 Dec. 9, 2004

(30) Foreign Application Priority Data

Sep. 4, 2001 (EP) .................................. 01203338

(51) Int. Cl.
*F16H 59/06* (2006.01)
(52) U.S. Cl. ......................................................... 474/17
(58) Field of Classification Search ...................... 474/8, 474/17, 18, 23, 28, 69, 70
See application file for complete search history.

(56) References Cited

U.S. PATENT DOCUMENTS

| 2,433,150 | A | * | 12/1947 | Palm .............................. 474/35 |
| 3,965,766 | A | | 6/1976 | Luenberger |
| 4,596,536 | A | * | 6/1986 | Okawa et al. ................... 474/8 |
| 5,328,412 | A | | 7/1994 | Durum |
| 5,800,298 | A | * | 9/1998 | Kanehara et al. ............... 474/8 |
| 5,931,756 | A | * | 8/1999 | Ohsono et al. .............. 474/167 |

FOREIGN PATENT DOCUMENTS

| DE | 195 17 929 | 11/1996 |
| DE | 198 57 708 | 6/1999 |
| EP | 0 896 171 | 2/1999 |
| EP | 0 931 959 | 7/1999 |
| EP | 1 087 156 | 3/2001 |

* cited by examiner

*Primary Examiner*—Vicky A Johnson
(74) *Attorney, Agent, or Firm*—Young & Thompson

(57) ABSTRACT

Continuously variable transmission includes a set of pulleys, each pulley comprising two discs arranged relatively axially moveable on a central pulley shaft for clamping a transmission belt. The belt includes a continuous array of transverse elements, each having lateral pulley contact surfaces for contacting the belt contact surface of each of the pulley discs, and being provided slideably on an endless tensile element of the belt. Each pulley has a mechanical stiffness as incorporated in the transmission and a stiffness related feature of a pulley when expressed as a parameter Sag that indicates an amount of radial displacement of the belt between the discs in the transmission, occurring in response to imposing a maximum amount of axial force $F_{ax}$ during operation of the transmission, relative to a radial position of the belt in an unloaded state of the transmission, amounts to less than 1.2 mm but more than 0.5 mm.

20 Claims, 4 Drawing Sheets

EFFICIENT HIGH TORQUE CONTINUOUSLY VARIABLE TRANSMISSION

The present invention relates to a continuous variable transmission as defined in the preamble of claim 1.

Such transmissions are generally known in the art for example from EP-B1-0.777.069 and are used for transmitting mechanical power in a motor vehicle from an engine to a load, i.e. the driven wheels, at a continuously variable torque ratio. They are typically designed for, and commercially operate at a cone angle of the pulley discs for contacting the assembled transmission belt of eleven degrees as taken relative to an imaginary radial line through the axis of rotation the relevant pulley, i.e. the centre line of a pulley shaft. The pulleys typically have a diameter between one to two hundred mm.

Yet little is, however, known in the art about the criteria, to be applied at designing the pulleys. Thus the principle design of a pulley in practice hardly deviates from the pulley designs devised in the early days of belt type continuous variable transmissions. It appears in practice that when a known pulley design is modified to even a slightly different cone angle, or to cope with an increased torque level, an otherwise properly functioning commercialised pulley may perform badly, particularly in terms of transmission efficiency. This means that an unexpectedly large amount of mechanical power is dissipated during operation of such a modified transmission. It is generally accepted that the stiffness of pulleys, alternatively denoted, the amount of axial pulley disc deflection therein at the radial outer edge of the discs, influences the performance of a transmission. No clarity exists, however, which relations validly define pulley stiffness, or how any conceivable relations could be explained when valid.

Apart from said cone angle the known transmission designs feature a certain stiffness based on the material applied in the pulleys, and a certain type of bearing, a certain amount of play at various fittings and bearings, all of which are known to influence the performance of the transmission. The direct relation between any of such features or the effect of their mutual interaction and the performance of the transmission is presently not exactly known nor apparently in control by design rules. Although the mentioned design characteristics per se, including e.g. the internal stiffness of a pulley disc are well within reach of a skilled man to be controlled to a desired level of quality, e.g. by applying a certain material composition or thickness, it is generally unclear how these features may individually or in common be applied for influencing the performance of a transmission. For example in relation to the transmission efficiency, it was revealed in practice that contemporary and proto-type transmissions that are designed and intended to be commercialised for applications having increased power and torque levels compared to currently commercialised transmissions by upscaling existing transmission designs, surprisingly do not reach the efficiency that may be expected on the basis of transmission efficiencies realised with these existing transmission designs. This phenomenon revealed itself especially at prototype transmissions featuring a relative small cone angle as may be preferred in certain applications, i.e. smaller than 11 degrees or transmission designs intended to cope with torque levels of 250 Nm or more.

Thus, it is an object of the invention to provide transmissions and a generally applicable design rule therefor in particular related to the pulleys thereof, which guarantees on the one hand that the transmission will operate safely at a proper level of efficiency without laying an undue burden on the design and production of other components applied in such transmission, and thus also accommodating the tendency towards applying very high axial clamping forces and/or smaller cone angles at which a belt and a pulley co-operate in a transmission.

According to the invention, such is realised when the said transmission further shows the characterising features of claim 1. In accordance with the idea underlying the invention and test results, it was found that a belt applied in a transmission not meeting the criteria developed in accordance with the claim, suffers from what is denoted extreme spiral running of the transmission belt within a pulley, i.e. a relatively large deviation of the theoretical circular trajectory. So as to come to a generally applicable rule for testing a pulley design this phenomenon has in accordance with the invention been tried to be captured in a single parameter by modelling, which parameter is referred to as Sag.

As to the assessment of spiral running of the transmission belt at or near the largest possible radius of curvature of the belt when running between the pulley discs, where it is the most often located at the pulley associated with said source of mechanical power during normal operation of the transmission, the actual running radius that locally describes the curved running path of the belt was found to sometimes change for more than 2 mm for pulleys of contemporary design that are typically applied in automotive applications. Accordingly, in such case each longitudinal section of the belt moves somewhat radially inward over the pulley discs, i.e. shows a slipping motion with respect to the pulley discs, as it passes along the said curved trajectory there between. Also, besides not conforming to the theoretical circular trajectory, the belt's trajectory was found to deviate from a shape that may be expected based on pulley disc deformation considerations such as are known from EP-A-0.962.679, wherein it is taught that as a result of the transmission belt being present between the pulley discs only over a part of the circumference thereof, the spacing between the pulley discs increases and subsequently decreases along the theoretical circularly curved trajectory of the transmission belt. From these known deformation characteristics it may be expected that the trajectory of the belt part running between the pulley discs would consist of a slight radially inward movement of the said longitudinal belt section at entering between the discs of a pulley and a corresponding radial outward movement of the belt at exiting from running between the pulley discs.

Such observed shape of the curved trajectory and such a large absolute change in the running radius of the transmission belt, thus was found to significantly differ from the form and amount thereof that may be expected beforehand. These phenomenon imply that the belt is continuously slipping between the pulley discs at least in radial direction. Since the assembled belt transmission belt that is presently under consideration is composed of a multitude of relatively thin transverse element, which are slideably mounted on an endless band, each transverse element may at least to some extent move freely with respect to neighbouring elements. Therefore, it may be concluded that such belt design is more susceptible to slip compared to longitudinally rigid belt designs such as a chain or a continuous V-belt. Thus the assembled transmission belt in combination with a large clamping force by which the belt is clamped between the said pulley discs and that is required in modern transmission creates much larger losses in efficiency of the belt in modified transmissions than those which would be anticipated. Especially at transmissions featuring a relative small cone angle, i.e. smaller than the 11 degrees that is presently applied in commercially available transmission, the spiral running effect at pulleys having a mechanical stiffness comparable with known pulley designs surprisingly appeared to be larger still, having the above explained adverse effect on the torque transmission efficiency even at the same or similar level of the clamping force.

According to the invention an important consequence of the observed spiral running of the belt, i.e. not following a circular trajectory nor a symmetrical path that comprises two sections each the mirrored image of the other, is that the normal force between belt and pulley discs is not distributed evenly along said curved trajectory, but rather appears to continuously increase. The maximum level of such force will thus be larger than what was previously thought. This effect becomes more pronounced at higher levels of the clamping force, i.e. at higher torque levels to be transmitted by the transmission.

It could be concluded from the above, that designing the pulleys to have a higher stiffness using well known constructional measures would be an adequate and simple measure to reduce the observed radial slip thereby improving transmission efficiency. However, according to the invention, it was further established in tests that a transmission of such a stiffer design would not necessarily function to satisfaction. It is hypothesised that this is caused by mechanism involved in shifting of the transmission, i.e. at a desired radial movement of the belt over its entire part located between the pulley discs. It appears that such radial movement is not only the result of the elements being forced to move, i.e. slip, in radial direction along the pulley disc surface, but is also supported by the deformation of the pulley discs as described above, which assists in the desired relative radial movement between individual transverse elements and the pulley discs. Accordingly, it is considered that increasing the stiffness of the pulleys does not automatically render an efficient and functional, transmission per se.

Apart from the identification and impact of the above described spiral running on the transmission operations, the invention features a new criterion and allowable value therein for determining the quality of performance of a transmission and in particular the torque transmission efficiency thereof. In this criterion, a maximum allowable amount of axial deflection of the pulley discs at a radially outermost edge thereof occurring during operation of the transmission is related both to the maximum level of the clamping force applied and to the cone-angle of the transmission.

The invention will now further be explained by way of examples given in the accompanying drawing wherein.

Figure 5:
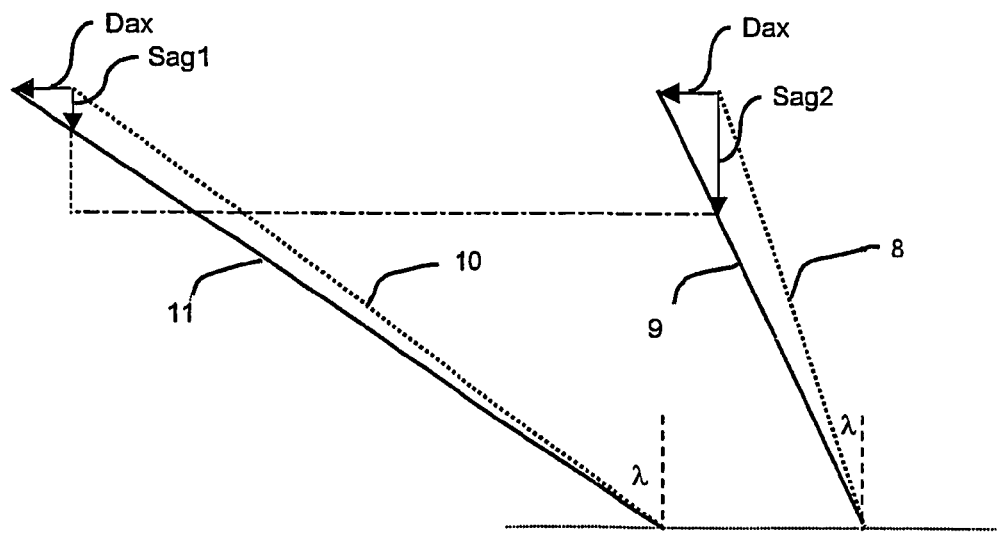
Figure 6:
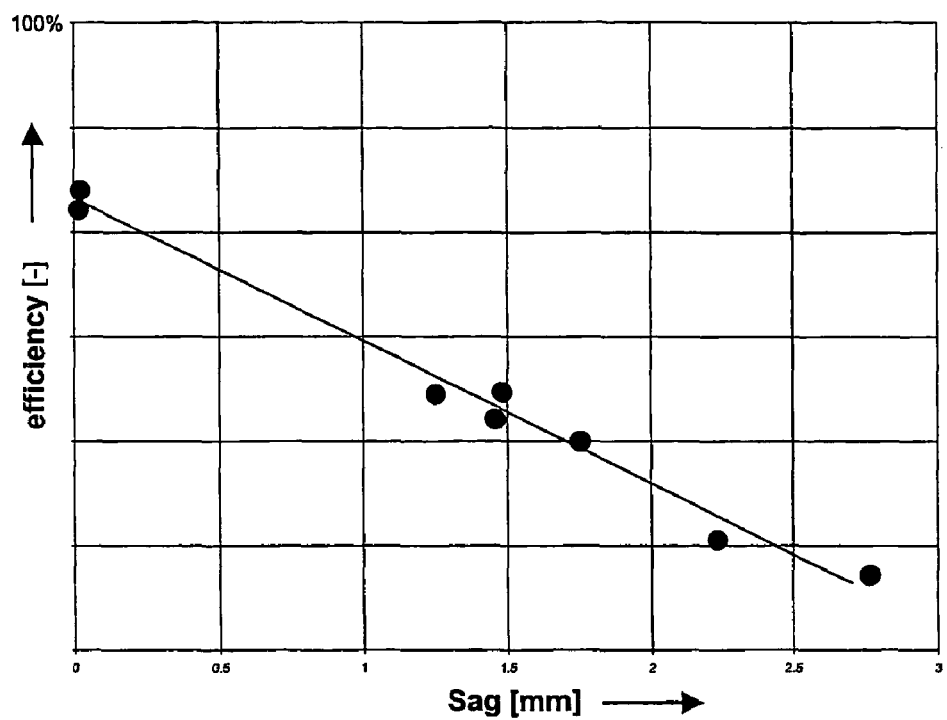
Figure 7:
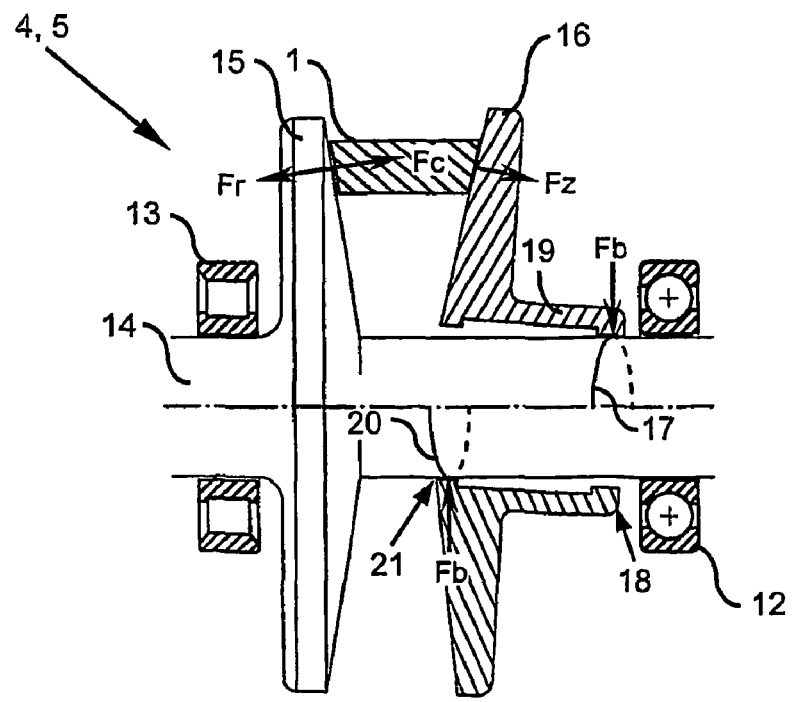
Figure 8:
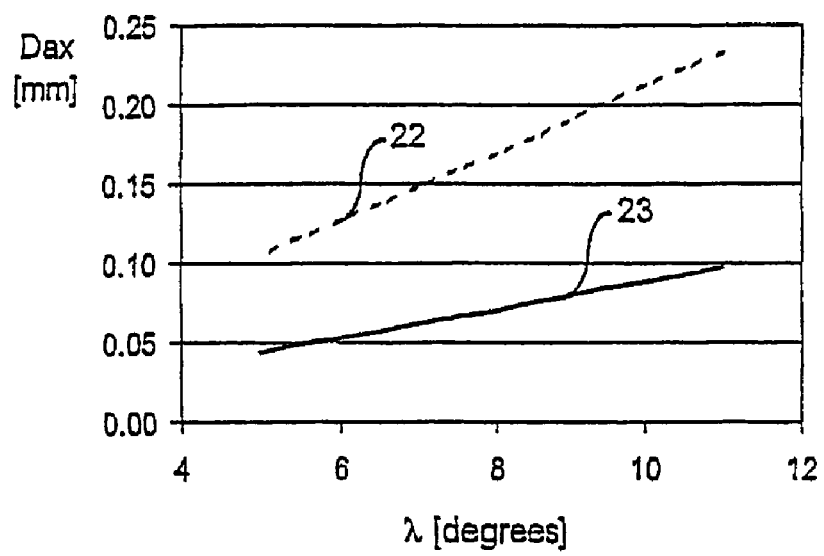
Figure 9:
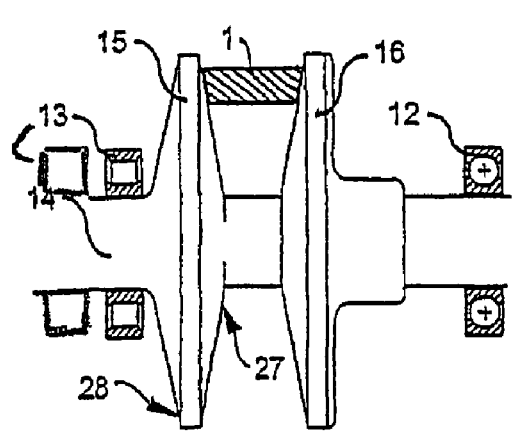
Figure 10:
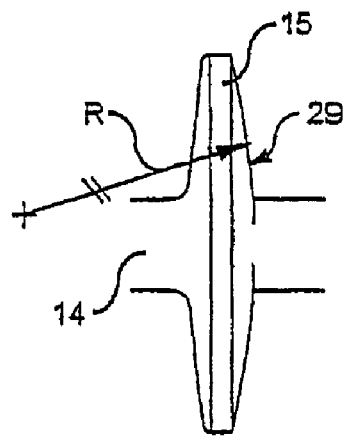

FIG. 5 schematically illustrates the effect of axial deflection of the pulley disc at different cone angles;

FIG. 6 is a plot indicating the transmission efficiency in relation to the amount of possible radial slip of the transmission belt in its curved trajectory part;

FIG. 7 is schematic representation of a pulley suited for FEM calculations;

FIG. 8 is a graph indicating the relation between cone angle and the axial deflection according to the invention;

FIG. 9 schematically illustrates a second measure according to the invention for improving the torque transmission efficiency of the transmission;

FIG. 10 schematically illustrates a third measure according to the invention for improving the torque transmission efficiency of the transmission.

Figure 1:
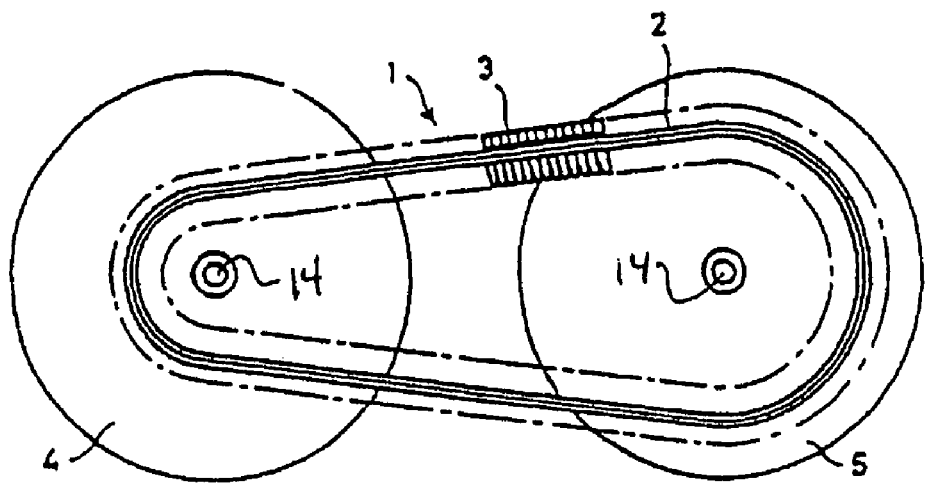
FIG. 1 is a schematic illustration of a side elevation of the continuously variable transmission to which the present invention relates provided with pulleys and a transmission belt.

FIG. 1 schematically shows a continuous variable transmission (CVT) with a transmission belt 1 which is made up of a tensile means 2 in the form of nested endless thin bands, and on which there are mounted an array of cross elements 3, alternatively denoted transverse elements, which may slide freely over the tensile means 2. The trajectory of the belt 1 shows a curved part where it runs on the pulleys 4, 5, i.e. between frusto-conical pulleys discs thereof. As the pulley discs of one pulley are urged towards each other, the belt 1 is locally forced to shift radially outward, whereby a radius of curvature of the belt's local trajectory, i.e. its so called running radius, increases. At the same time, due to the virtually constant circumference length of the belt 1, a belt part between the discs of the other pulley shifts radially inward whereby its urges the pulley discs apart and the local running radius decreases. The running radius of the belt 1 in the respective pulleys 4 and 5 determines the torque transmission ratio between the pulleys, which may be continuously varied by the said radial shifting of the belt 1. Such a continuous variable transmission is known per se. A typical thickness of the said band ranges from 0.15 to 0.25 mm, whereas a typical width of the belt 1 ranges from 15 to 35 millimeters at a typical circumference length thereof that range from 50 to 100 cm. For reasons of economical production and for preventing technical complexity, usually only one pulley disc is arranged axially movable to allow said radial shifting, whereas the other disc is arranged axially fixed with respect to the pulley shaft.

Figure 2:
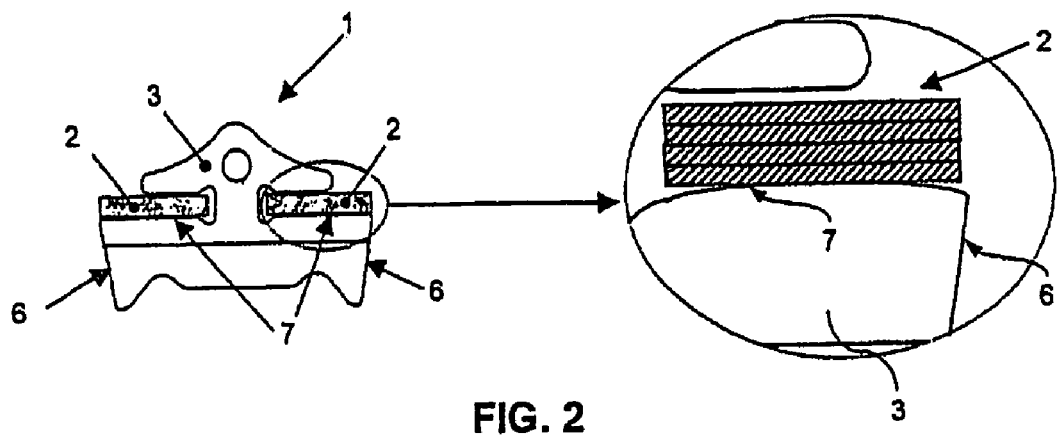
FIG. 2 is a schematic representation of the transmission belt comprising a tensile means whereon a large number of transverse elements are mounted. The figure includes an enlargement of the arrangement showing the tensile means to comprise a number of bands as well as the interaction between a band and a saddle surface of the element.

FIG. 2 depicts a longitudinal cross section of the belt 1, showing a front view of the transverse element 3 and a cross section of the tensile means 2. On its lateral sides the cross element 3 is provided with pulley contact surfaces 6 by which it may rests against the belt contact surface of the frusto-conical pulley discs of a pulley. The element 3 is further provided with so called saddle surfaces 7 that may interact with the tensile means 2, in particular in a part of the belt's 1 trajectory curved in longitudinal direction where the belt runs clamped between the discs of a pulley.

Figure 3:
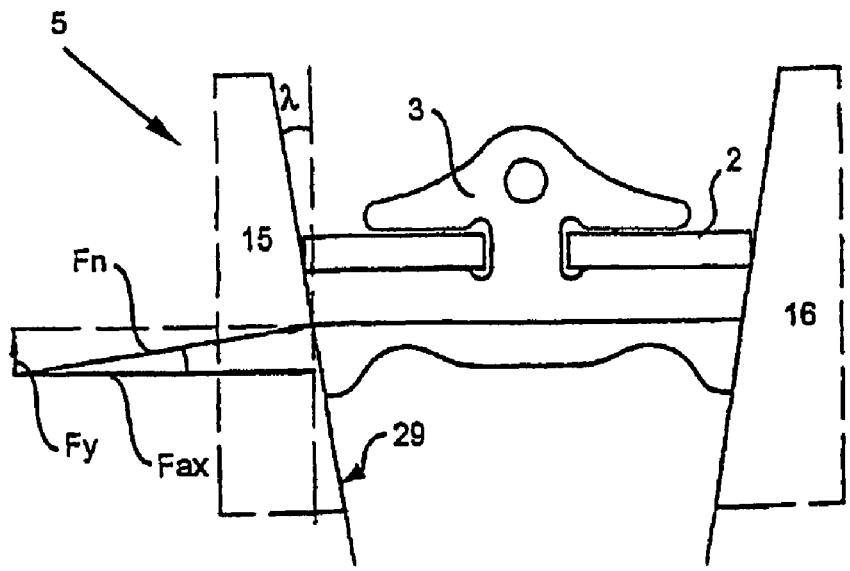
FIG. 3 is a figurative representation of forces exerted by the pulley on the transmission belt as represented in a schematic transverse section of the belt when wedged between the discs of the pulley.

FIG. 3 schematically represents the forces acting between a belt and the pulley within a transmission. The normal force Fn, acting perpendicular to the local plane of contact between the pulley 4 and the belt 1 is commonly realised by the application of a hydraulic pressure on the axially outer face of at least one disc of the pulley 4. To this end, a piston/cylinder assembly is accommodated in a known manner whereby either the cylinder is fixed to the pulley shaft and the piston is fixed to a pulley disc 16 that is an axially movable with respect to the pulley shaft 14 or vice versa. The cylinder is in turn fed by a hydraulic pump, usually made part of the transmission. By the exerted hydraulic pressure the moveable disc 16 is urged in a direction towards the respective other disc 15 wedging the belt in between said discs 15, 16, which results in said normal or reaction force Fn. In dependence of the relevant cone angle λ of a pulley disc 15, 16 the normal force Fn may mathematically be split up in an axial directed force component Fax, alternatively denoting the belt clamping force and a radial outward directed component Fy. The sum of the axial forces Fax acting on all transverse elements 3 in contact with a pulley 4, 5 and the local coefficient of friction μ determine the force transferable between the belt 1 and the pulley 4 by means of friction, which in combination with the local running radius of the belt determines the maximum amount of torque that may be put on the pulley shaft by the belt 1, or vice versa without mutual slip in a tangential direction occurring there between. In this respect, when present such tangential usually occurs at the pulley 4, 5 having the smallest amount of contacting transverse elements 3, i.e. where the running radius, i.e. the radius of curvature of the said longitudinally curved trajectory part, of the belt 1 is smallest. Moreover, by increasing the clamping force for one of the pulleys 4, 5 with respect to the other, the elements 3 clamped between the discs of said one pulley 4, 5 may be urged radial outwardly. Otherwise the elements 3 may move radial inwardly when the clamping force of this one pulley 4, 5 is reduced in favour of the clamping force of the other pulley 4, 5.

Since at both pulleys 4, 5 the belt 1 receives a radially outward directed force Fy that urges the elements 3 outward, the tensile means 2 is set under a certain tension through contact with the saddle surfaces 7 of the elements. Hereby the tensile means 2 performs a function in maintaining the integrity of the belt 1. The saddle surfaces 7 are shaped slightly convex in transverse direction so as to promote a centred tracking of the tensile means 2 on the said saddle surfaces 7 during the numerous number of revolutions that a belt 1 undergoes at transmitting power from one pulley 4, 5 to the other during operation of the transmission.

Also in FIG. 3 the transmission is shown in a condition near the so called OD condition in which condition the belt 1 at a drive pulley 5, i.e. the pulley 5 that provides a friction force on the belt 1 driving it into a tangential direction, has assumed a largest possible radial position between the discs of the pulley 15, 16. The OD condition is the most often occurring condition during operation of the transmission. From the illustration of FIG. 3 it may be taken that at an axially deflection of the pulley discs, i.e. a local bending apart of the pulley disc or discs under the influence the reaction force to the said clamping force Fax, the belt 1 locally assumes a radial position which is displaced by an amount Sag radially inwardly. Certainly at the outer edge of the discs, each pulley design is to a larger or lesser extend prone to such axial deflection Dax under the exertion of the axial force Fax due to its limited stiffness, which causes the belt 1 to assume a more radially inward running path under the influence of the tensile means 2 acting on the saddle surfaces 7, while it passes it's trajectory within the pulley 4, 5. This effect, measured with probes accurately sensing a radial disposition of the belt 1, is in the present invention called spiral running of the belt.

Figure 4:
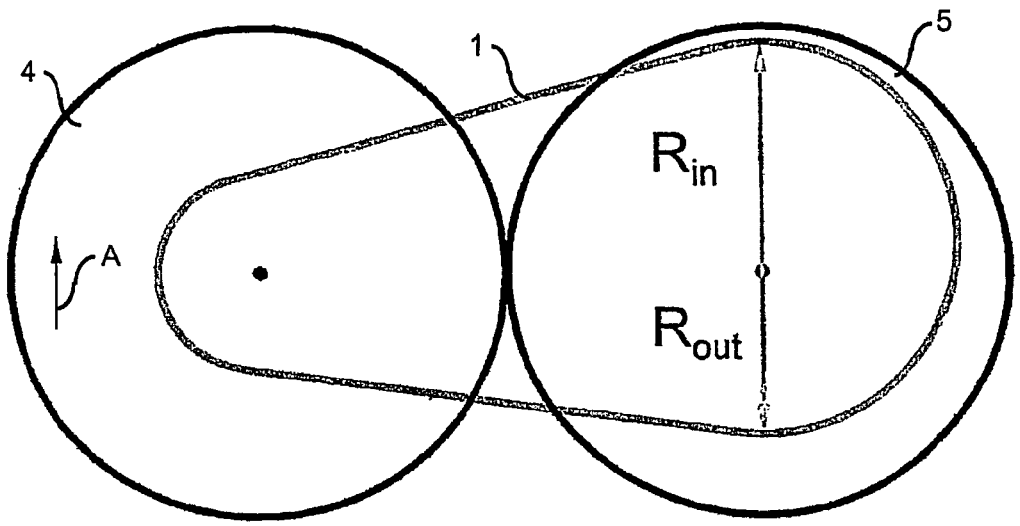
FIG. 4 is an illustration of possible trajectory of the transmission belt showing the spiral running on the basis of typical measurement data related to this phenomenon.

FIG. 4 is a schematic illustration of the running path of a belt in a transmission as discovered by the research underlying the invention, wherein the radial inward displacement of the belt 1 has been considerably exaggerated. It shows that between the discs of the pulley 5 this path deviates from the ideal running path where it running path corresponds to a circular trajectory of certain radius. It also deviates from the path that may be expected based on known pulley deformation as a result of the fact the belt 1 is only present between the said discs over a part of their circumference. In fact the curved part of the belt's trajectory as found in accordance with the invention, in most cases, shows a steady, virtually none reversing decline of the running radius of a belt. As mentioned earlier the amount of radial displacement of the belt 1 in one such curved part was found to be unexpectedly large. Moreover, from the shape of the path it may be concluded that the said normal force Fn increases in the direction of movement of the belt 1, from which it may be concluded that the maximum normal force Fn occurring, is considerably larger than its nominal or average value that may be calculated based on the pressure exerted in the said pressure chamber and the total surface area of the contact faces 6 of the elements 3 present between the pulley discs at any one time.

Such large amount of radial inward motion, or radial slip of the belt 1 at such large normal force results in a considerable loss of transmission efficiency. All the more, since radial slip inevitably also leads to tangential slip because the transmission belt 1 has a longitudinal speed that can correspond to the tangential speed of the pulley disc only at a single running radius, whereas due to the said spiral running the belt 1 in fact is in contact with the pulley discs at several radii simultaneously at any one instance. According to the invention, the transmission efficiency is particularly adversely affected in case of transmissions operating with a cone angle λ smaller than 11 degrees such as those that are currently being developed for future commercial applications.

FIG. 5 illustrates the influence of the cone angle λ on this phenomenon underlying the invention. FIG. 5 shows that for a given axial deflection Dax of the pulley discs, which deflection is of course determined by the stiffness of a pulley and the clamping force, the amount of radial inward displacement of the belt Sag that results therefrom considerably increases as the cone angle λ decreases. In accordance with the invention the phenomenon is taken into account by dividing the axial deflection Dax of the moveable disc by the tangent of the cone angle λ. In FIG. 5 the lines 9 to 11 represent different orientations of the belt contacting surface of a pulley discs, for example the left disc of the pulley 4 depicted in FIG. 3. Lines 8 and 9 relate, to such contacting surface incorporated under a relatively small cone angle λ, e.g. 5 degrees, whilst lines 10 and 11 relate to such contacting surface incorporated under the typically applied cone angle λ of about 11 degrees. It is demonstrated that at an identical amount of axial deflection Dax of both surfaces 8 and 10, assuming the posture denoted as 9 and 11 respectively, the resulting radial movement of the belt Sag2 for the contacting surface 8, 9 oriented at the small cone angle λ is considerably larger than that Sag1 for the contacting surface 10, 11 oriented at the larger cone angle λ, whereby the Sag parameter may be calculated by diving the axial deflection Dax by the tangent of the cone angle λ.

An illustration of the predictive capacity of the invented criterion, alternatively denoted the Sag parameter is given by FIG. 6. The graph in FIG. 6 shows the loss in the torque transmission efficiency for several values of Sag between 0 and 3 mm. It appears that the predicted efficiency of the CVT-transmission designed according to this parameter drops significantly, as demonstrated by the circular dots in the graph, which relate to prototype and commercially applied pulley designs of different mechanical stiffness and different cone angle λ. It is remarked that it is assumed that efficiency loss in load bearings 15, 18 and losses in the belt 1 itself remain equal between infinitely stiff and practical pulley designs. It is also assumed that any other efficiency losses may be subscribed to the value of Sag.

According to the invention, instead of measuring the radial inward displacement of the belt, i.e. the Sag parameter, the value thereof may be accurately and conveniently approximated by a FEM calculation method, which is defined below. Such method allows the validation of a new pulley design with respect to the phenomenon of torque transmission efficiency, even before a prototype has been manufactured. The method is based on a generally applicable and available computerised and standardised FEM calculations, departing from a set of data in which all values of X, Y and Z dimensions of the geometrical features of the pulley shaft 14 and the fixed disc 15 and the net forces exerted thereon by the transmission belt, the movable pulley disc and the shaft bearings, as discussed in the below with reference to FIG. 7. The X-direction is the axial direction, which also is the axis of rotation of the pulley 4, whereas the Y and Z directions are oriented perpendicular thereto and to each other. The bearings 12, 13 of the pulley shaft 14 are considered and introduced in the FEM calculation as a so-called multi-point constraint (MPC), i.e. a mesh node located on a centre line of the shaft 14 corresponding to the halfway point of the axial dimension of the bearing, which node is surrounded by nodes lying on the radial outer surface of the shaft 14 over the said axial dimension of the bearing 12, 13, which latter nodes follow any translation and rotation of the said central node. One bearing 13 is fixed in the Y- or Z-directions but allows translations in the X-direction, whereas the other bearing 12 is fixed in all of the X, Y and Z directions. The bearings 12, 13 are further considered fixed with regard to rotation about the X-direction, whereas rotations about the Y- or Z-directions are allowed.

According to the invention, for the purpose of calculating the axial deflection of the fixed pulley disc 15, the clamping force and the reaction force are considered to be equally distributed over all the transverse elements 3 that are clamped between the said discs 15, 16. The clamping forces exerted on the belt and the reaction force accompanying the clamping force are in this standardised FEM calculation according to the invention applied as pressures.

The method further deals with bending forces on the shaft 14 by a tilting motion of the movable disc 16 and its sleeve 19 of the shaft 14 that occurs in practice and that originates from the reaction force exerted by the belt 1 on the movable disc, which is schematically indicated in FIG. 7 to a considerably exaggerated extend. In the calculation method such bending forces to be equally distributed over half of the shaft's circumference 20 at one axial end 21 thereof closest to the fixed disc 15 and over the opposite half of the shafts circumference 17 at the opposite axial end 18 thereof and also equally distributed over the axial extend of such circumferences that conforms to the area where the movable disc 16 and the shaft 14 would contact during operation under the influence of the said reaction force. It was found that an area of about 3 mm that starts about 0.5 mm inward from the precise axial position on the shaft of the said axial ends 21, 18 is a good approximation thereof. The axial deflection Dax calculated with the thus created FEM calculation method also includes the contribution of a bending of the pulley shaft 14.

The FEM elements used in the calculation method are 2D mesh and so-called QUAD4. The size is 5 mm and approximately 1000 elements are used. The aspect ratio is smaller than 5. 3D elements are created by rotating 2D elements 24 times over 15 degrees. Of course, only halve of the 3D model is actually required (i.e. 12 times 15 degrees) because the construction can be divided in to two mutually symmetrical halves. The pulley material is specified by its E-modulus and Poisson's ratio, which for common steel may be set at 210.000 N/mm$^2$ and 0.3 respectively.

With the above-described FEM calculation method the axial deflection of the pulley discs may be easily determined and the Sag parameter is obtained by dividing the said axial deflection Dax by the tangent of the cone angle λ. Generally the most extreme Sag value for a transmission is obtained for the drive pulley with the transmission operating in OD-condition at a maximum transmission torque level in such OD-condition and with a corresponding maximum clamping force applied. It may be appreciated that the criterion Sag is universal in that it applies for any pulley design, irrespective of the cone angle. It is quite advantageous in that it allows a check of a pulley design as to a prediction of its level of performance in reality, before the pulley even has been build, by performing a relatively simple FEM calculation along the directions provided by this invention.

In FIG. 8, as a consequence of the earlier mentioned insight underlying the invention, a relation between a practically tolerable maximum amount of axial deflection Dax and the value of the cone angle λ is represented. The radial lowering of a belt in a pulley Sag is in accordance with the invention calculated from these parameters by dividing the amount of axial deflection Dax, as calculated from the standardised FEM model of the pulley, by the tangent of the cone angle, i.e. by tan(λ).

It was found in practice in accordance with the underlying research and analysis that proper functioning of a transmission can with good certainty be found at Sag values below 1.2 mm. According to the invention it is, however, also to be considered preferable that the Sag parameter is larger than 0.5 mm, because according to the invention, at least some radial slip is required for the reliable operation of the transmission, e.g. for realising fast and smooth shifting of the transmission ratio by a desired radial movement of the belt. Moreover, at least some deformation of the pulley discs and thus a notional value of the Sag parameter may even be considered an advantage, because the forces between the elements and the discs are then distributed over a certain area whereby the contact stresses are kept within design limits and whereby the elements assume a well defined posture between the pulley discs. Said Sag value of 0.5 mm was found to be a suitable lower boundary. In FIG. 8, the curves 22 and 23 are respectively draw for Sag equals 1.2 mm and Sag equals 0.5 mm. Between the said curves 22 and 23 an area of applicable values for the axial deflection Dax of a pulley disc in combination with values for the cone angle λ is defined. Transmissions designed with the above-mentioned constraints have optimum torque transmission efficiency even when transmitting a relatively high torque and/or when incorporating a relatively small cone angle λ, i.e. smaller than 11°.

According to the invention, at small desired values for the axial deflection Dax a further aspect becomes relevant. It may be appreciated that for realising such small deflections Dax, the pulley structure may need to be considerably strengthened. In fact such required strengthening may become that elaborate that any increase in efficiency due to a decrease of the radial slip of the belt is completely counteracted by an decrease thereof due to the increased mass of the pulley to realise such small deflection Dax, or, additionally, the manufacturing cost become so high that they are no longer compensated by the said increased efficiency. According to the invention an axial deflection Dax of about 0.1 mm is considered a practically applicable optimum value. From FIG. 8 it appears that at such Dax value the entire range of cone angles λ between 5 and 11 degrees can be applied within the Sag range as claimed by the present invention.

According to the invention, known pulley designs may be brought into conformity with the present invention by adopting such pulley design in a transmission wherein the maximum clamping force that is applied during operation is relatively low, or, alternatively, by generally stiffening the pulley construction, e.g. by using another, more rigid, material or by using more material, e.g. a thicker shaft or thicker discs.

The invention also provides for favourable pulley design modifications that enable the adaptation of the design to cope with a high maximum clamping force while enabling the torque transmission efficiency to be improved, which modifications are considered more efficient and effective than the above-mentioned obvious but unfavourable and expensive measures of adding more material or using an inherently stiffer material. Thus the invention further provides for several measures that may be applied to known pulley designs so as to reduce the value of the Sag parameter and to allow the transmission to be operated at an improved efficiency.

In a first measure according to the invention, a third bearing is added around the pulley shaft 14 having a bearing on each side of the set of pulley discs adjacent thereto, said third bearing being fitted immediately adjacent to the bearing of the fixed disc 15. By this measure bending of the shaft 14 under the influence of the said bending forces Fb is largely reduced. Thereby the axial deflection Dax of the pulley discs 15, 16 may be greatly reduced, in some cases even halved. Alternatively, the shaft diameter 14 may be increased, however, this is generally not preferred in the art, since it only comes at an increase in the overall size of the transmission or a reduction of the range of available transmission ratios. This measure relies on the important insight that the axial deflection of the fixed disc 15 will generally be considerably larger than that of the axially movable disc 16, because said former disc 15 is only supported in axial direction where it is fixed to the shaft 14, whereas the axially movable disc experiences an axially oriented force due to the pressure exerted in the piston of the piston/cylinder assembly which generally extends over a large part of the radial dimension of the relevant disc 16, possibly even between the shaft 14 and a radially outer edge of the disc 16. Therefore, additionally supporting the fixed disc will generally be far more effective in reducing the maximum amount of axial deflection Dax than implementing the same measure at the axially movable disc.

In a second measure according to the invention illustrated in FIG. 9, at least the fixed pulley disc 15 of a pulley 4, 5 is strengthened by increasing its axial dimension, however, to conserve weight such increase is applied not over the entire tangential dimension of the disc 15, but only locally for instance by incorporating a number of radially oriented strengthening ribs having a limited tangential dimension or by providing recesses or holes in the surface of the disc 15 facing axially away from the belt 1. Preferably such recesses or holes are mutually in a hexagonal relationship. According to the invention it is particularly advantageous to generally reinforce the radially inward located base 27 of the disc 15, such that the axial width of the disc 15 increases considerably in radial outward direction along from the said base 27 to its radially outer edge 28.

In a third and final measure according to the invention, the cone angle λ of at least the fixed pulley disc 15 is provided such that it increases in radial outward direction between a most radial inward position on its belt contact surface 29 and a most radial outward position thereon, which is illustrated for the fixed disc 15 of a pulley in FIG. 10. As explained in the above the cone angle λ has a large influence on the Sag parameter for a given axial deflection Dax. It may, however, also be understood that the said axial deflection Dax or, alternatively, amount axially outward bending of a pulley disc 15 increases with an increasing radial position on the pulley disc where such deflection is determined, because of the increasing force moment of the reaction force Fr with respect to the pulley shaft 14. Thus by applying a larger cone angle λ in radial outward direction on the said contact surface 29, the effect of the axial deflection Dax increasing in such direction, may be counteracted to a smaller or larger extend. To this effect the cone angle of a pulley disc 15 increases continuously in radially outward direction, e.g. by giving the contact surface 12 a suitable arc shape having a radius of curvature R as seen in a tangential cross section, as indicated in FIG. 10. Preferably, however, a spline curve is used to define the shape of the contact surface 29. According to the invention, in this respect it is considered preferable if said spline curve is chosen such that during operation the maximum value of the radial Sag-parameter is essentially constant for each radial position on the pulley disc. This was found to be approximately the case when the cone angle is about equal to 7 degrees at the most radial inward position on the contacting surface 29 of the pulley disc 15 and gradually increases to about 11 to 12 degrees at the most radial outward position thereon.

By designing a pulley in accordance with the invention, it will be realised that the torque transmission efficiency to be achieved in reality by a transmission design may be predicted and be consciously controlled in advance in a largely reliable manner. As may be evident from the present description, the single parameter Sag according to the invention takes account of the major factors influencing such efficiency, including mechanical stiffness of the pulley construction, the cone angle λ, and the amount clamping force Fc on the belt.

It is further remarked that the present invention is particularly relevant for a transmission equipped with the type of assembled transmission belt described herein. This is caused by the fact that the elements 3 or mounted movably on the carrier so that they are displaceable with respect to each other to a limited extend, whereas for instance a chain belt or a rubber band to a certain extend form a continuous structure. Thus the behaviour and trajectory of the assembled belt, will be influenced by the said axial deformation or deflection of the pulley discs to a relatively large extend.

The invention not only relates to the entirety of the preceding description and all details of the pertaining figures, but also to all the features of the following claims.

The invention claimed is:

1. Continuously variable transmission for motor vehicles, comprising:
    an endless tensile means (2);
    a continuous array of transverse elements (3),
    said tensile means (2) and said transverse elements (3) together forming a transmission belt (1); and
    a set pulleys (4, 5), each pulley mounted on a respective central pulley shaft (14),
    each pulley (4, 5) having a mechanical stiffness and comprising a fixed disc (15) axially fixed with respect to said pulley shaft (14) and a movable disc (16) axially movable, under influence of a pressure exerted on said movable disc, for clamping said belt (1) between said discs (15, 16),
    the exerted pressure providing a clamping force exerted on said belt (1) by said discs (15, 16) and comprising an axial force Fax exerted on said movable disc (16),
    each disc having a belt contact surface (29),
    each transverse element (3) having lateral pulley contact surfaces (6) for contacting said belt contact surface (29) of each of said discs (15, 16) and being provided slideably on said tensile means (2) of said belt (1),
    said belt contacting surfaces (29) mutually being oriented in a disposition with radially outward increasing mutual distance such that a cone angle λ is formed between each said belt contacting surface (29) and an imaginary radial line through said pulley shaft (14),
    said cone angle λ defining the angle under which said contact faces (29) and said transverse elements (3) mutually contact at each radial position of said belt (1) with respect to an axis of rotation of said pulley (4, 5), wherein a stiffness related feature of each said pulley (4, 5), when expressed as a parameter Sag that indicates an amount of radial displacement of said belt (1) between said discs (15, 16) occurring in response to imposing a maximum amount of said axial force Fax during operation of said transmission, said displacement being measured relative to an initial radial position of said belt (1) in an unloaded state of the transmission, has a value in the range between 0.5 mm and 1.2 mm.

2. Transmission according to claim 1, wherein the Sag parameter is determined by a maximum amount of axial deflection Dax at a radial outer edge of the relevant pulley disc (15, 16) occurring in response to imposing the maximum amount of the said axial force Fax during operation of the transmission divided by the tangent of the cone angle λ of the transmission.

3. Transmission according to claim 2, wherein the axial deflection Dax is approximated by a FEM calculation method.

4. Transmission according to claim 2, wherein the maximum amount of axial deflection Dax at a radial outer edge of the relevant pulley disc (15, 16) occurring in response to imposing the maximum amount of the said axial force Fax during operation of the transmission is about 0.1 mm.

5. Transmission according to claim 1, wherein the cone angle λ of the transmission is less than 11 degrees.

6. Transmission according to claim 1, wherein the transmission is designed to and capable of transmitting at least 250 Nm.

7. Transmission according to claim 1, wherein the cone angle λ at which the belt (1) and each said pulley (4, 5) co-operate in said transmission has a value in a range between 6 and 10 degrees.

8. Transmission according to claim 1, wherein the pulley shaft (14) is provided with at least three bearing means (12, 13), at least two bearing means being located immediately adjacent to the fixed disc (15) of the pulley (4, 5) for limiting a bending of the shaft (14) during operation of the transmission.

9. Transmission according to claim 1, wherein an axial width of at least the fixed disc (15) of a pulley (4, 5) increases considerably from a radially outer edge (28) thereof in a radial inward direction towards an radially inward located base (27), whereby as seen in tangential direction the said axial width varies along the circumference of the disc (15).

10. Transmission according to claim 1, wherein at least one disc (15) of the pulley (4, 5) is provided such that the cone angle λ increases in radial outward direction along the belt contact surface (29) of the disc (15).

11. Transmission according to claim 10, wherein the cone angle λ lies within the range between 7 and 12 degrees.

12. Continuously variable transmission for motor vehicles, comprising:
an endless tensile means (2);
a continuous array of transverse elements (3),
said tensile means (2) and said transverse elements (3) together forming a transmission belt (1); and
a set pulleys (4, 5), each pulley mounted on a respective central pulley shaft (14),
each pulley (4, 5) having a mechanical stiffness and comprising two discs (15, 16) with at least one of the two discs being a movable disc (16) axially movable, under influence of a pressure exerted on said movable disc, for clamping said belt (1) between said discs (15, 16),
the exerted pressure providing a clamping force exerted on said belt (1) by said discs (15, 16) and comprising an axial force Fax exerted on said movable disc (16),
each disc having a belt contact surface (29),
each transverse element (3) having lateral pulley contact surfaces (6) for contacting said belt contact surface (29) of each of said discs (15, 16) and being provided slideably on said tensile means (2) of said belt (1),
said belt contacting surfaces (29) mutually being oriented in a disposition with radially outward increasing mutual distance such that a cone angle λ is formed between each said belt contacting surface (29) and an imaginary radial line through said pulley shaft (14),
said cone angle λ being less than 11 degrees,
said cone angle λ defining the angle under which said contact faces (29) and said transverse elements (3) mutually contact at each radial position of said belt (1) with respect to an axis of rotation of said pulley (4, 5),
wherein a stiffness related feature of each said pulley (4, 5), when expressed as a parameter Sag that indicates an amount of radial displacement of said belt (1) between said discs (15, 16) occurring in response to imposing a maximum amount of said axial force Fax during operation of said transmission, said displacement being measured relative to an initial radial position of said belt (1) in an unloaded state of the transmission, has a value in the range between 0.5 mm and 1.2 mm.

13. Transmission according to claim 12, wherein the transmission is designed to and capable of transmitting at least 250 Nm.

14. Continuously variable transmission for motor vehicles, comprising:
an endless tensile means (2);
a continuous array of transverse elements (3),
said tensile means (2) and said transverse elements (3) together forming a transmission belt (1); and
a set pulleys (4, 5), each pulley mounted on a respective central pulley shaft (14),
each pulley (4, 5) having a mechanical stiffness and comprising two discs (15, 16) with at least one of the two discs being a movable disc (16) axially movable, under influence of a pressure exerted on said movable disc, for clamping said belt (1) between said discs (15, 16),
the exerted pressure providing a clamping force exerted on said belt (1) by said discs (15, 16) and comprising an axial force Fax exerted on said movable disc (16),
each disc having a belt contact surface (29),
each transverse element (3) having lateral pulley contact surfaces (6) for contacting said belt contact surface (29) of each of said discs (15, 16) and being provided slideably on said tensile means (2) of said belt (1),
said belt contacting surfaces (29) mutually being oriented in a disposition with radially outward increasing mutual distance such that a cone angle λ is formed between each said belt contacting surface (29) and an imaginary radial line through said pulley shaft (14),
said cone angle λ defining the angle under which said contact faces (29) and said transverse elements (3) mutually contact at each radial position of said belt (1) with respect to an axis of rotation of said pulley (4, 5),
wherein a stiffness related feature of each said pulley (4, 5), when expressed as a parameter Sag that indicates an amount of radial displacement of said belt (1) between said discs (15, 16) occurring in response to imposing a maximum amount of said axial force Fax during operation of said transmission, said displacement being measured relative to an initial radial position of said belt (1) in an unloaded state of the transmission, has a value in the range between 0.5 mm and 1.2 mm, and wherein the transmission is designed to and capable of transmitting at least 250 Nm.

15. Transmission according to claim 14, wherein the maximum amount of axial deflection Dax at a radial outer edge of the relevant pulley disc (15, 16) occurring in response to imposing the maximum amount of the said axial force Fax during operation of the transmission is about 0.1 mm.

16. Transmission according to claim 14, wherein the cone angle $\lambda$ has a value in a range between 6 and 10 degrees.

17. Transmission according to claim 14, wherein the cone angle $\lambda$ has a value in a range between 7 and 12 degrees.

18. Transmission according to claim 14, wherein an axial width of at least a fixed disc (15) of a pulley (4, 5) increases considerably from a radially outer edge (28) thereof in a radial inward direction towards an radially inward located base (27), whereby as seen in tangential direction the said axial width varies along the circumference of the disc (15), incorporating radially oriented strengthening ribs having a limited tangential dimension.

19. Transmission according to claim 14, wherein at least one disc (15) of the pulley (4, 5) is provided such that the cone angle $\lambda$ increases in radial outward direction along the belt contact surface (29) of the disc (15).

20. Transmission according to claim 14, wherein the cone angle $\lambda$ of the transmission is less than 11 degrees.

\* \* \* \* \*